United States Patent
Large

(10) Patent No.: US 11,267,477 B2
(45) Date of Patent: Mar. 8, 2022

(54) DEVICE AND METHOD FOR ESTIMATING THE ATTENTION LEVEL OF A DRIVER OF A VEHICLE

(71) Applicant: PSA AUTOMOBILES S.A., Poissy (FR)

(72) Inventor: Frederic Large, Montigny le Bretonneux (FR)

(73) Assignee: PSA AUTOMOBILES S.A., Poissy (FR)

( * ) Notice: Subject to any disclaimer, the term of this patent is extended or adjusted under 35 U.S.C. 154(b) by 871 days.

(21) Appl. No.: 15/999,110

(22) PCT Filed: Feb. 6, 2017

(86) PCT No.: PCT/FR2017/050268
§ 371 (c)(1),
(2) Date: Aug. 17, 2018

(87) PCT Pub. No.: WO2017/140969
PCT Pub. Date: Aug. 24, 2017

(65) Prior Publication Data
US 2021/0155249 A1    May 27, 2021

(30) Foreign Application Priority Data
Feb. 19, 2016 (FR) ...................... 1651371

(51) Int. Cl.
*G06K 9/00* (2006.01)
*B60W 40/08* (2012.01)
*B60W 50/14* (2020.01)

(52) U.S. Cl.
CPC ............ *B60W 40/08* (2013.01); *B60W 50/14* (2013.01); *G06K 9/00221* (2013.01);
(Continued)

(58) Field of Classification Search
CPC ................. B60W 40/08; B60W 50/14; B60W 2420/42; B60W 2540/221;
(Continued)

(56) References Cited

U.S. PATENT DOCUMENTS

| | | | |
|---|---|---|---|
| 2006/0217860 A1* | 9/2006 | Ihara | B62D 15/025 701/41 |
| 2015/0045986 A1* | 2/2015 | Kan | B60W 40/08 701/1 |
| 2015/0186733 A1* | 7/2015 | Hayakawa | G06K 9/00805 382/103 |

(Continued)

FOREIGN PATENT DOCUMENTS

| | | |
|---|---|---|
| EP | 2065835 A2 | 6/2009 |
| EP | 2797320 A1 | 10/2014 |
| FR | 2947769 A1 | 1/2011 |

OTHER PUBLICATIONS

Visual Lane Analysis—A Concise Review—Bok-Suk Shin and Reinhard Klette Computer Science Department, Tamaki Innovation Campus The .enpeda.. Project, The University of Auckland, New Zealand (Year: 2013).*

(Continued)

*Primary Examiner* — Dhaval V Patel
(74) *Attorney, Agent, or Firm* — Sandberg Phoenix & von Gontard P.C.

(57) ABSTRACT

The invention pertains to a method for estimating the attention level of the driver of a vehicle in a traffic lane, comprising the following steps: —the continuous capture of images (10) of the ground, —the reconstruction of an aerial view (11, 12) of a ground segment at successive instants t, —the reconstruction of an aerial view (11, 12) of a road segment at successive current instants t, —the estimation of the lateral position of the vehicle (100) in the reconstructed aerial view (11, 12), and the storage of said estimated aerial view (11, 12), and the storage of said estimated (Continued)

positions of the vehicle, —the determination of an estimated attention level of the driver at a past instant t3, as a function:
o of the evolution of the lateral position of the vehicle, o of the analysis of the profile of a road portion at least partially situated upstream of the vehicle at the instant t3.

10 Claims, 1 Drawing Sheet

(52) U.S. Cl.
CPC ..... *G06K 9/00798* (2013.01); *G06K 9/00845* (2013.01); *B60W 2420/42* (2013.01); *B60W 2540/221* (2020.02); *B60W 2540/229* (2020.02); *B60W 2552/53* (2020.02)

(58) Field of Classification Search
CPC ....... B60W 2540/229; B60W 2552/53; B60W 2040/0818; B60W 2050/143; G06K 9/00221; G06K 9/00798; G06K 9/00845
See application file for complete search history.

(56) References Cited

U.S. PATENT DOCUMENTS

| | | | | |
|---|---|---|---|---|
| 2016/0379064 | A1* | 12/2016 | van Beek | G06K 9/4652 |
| | | | | 382/104 |
| 2017/0263014 | A1* | 9/2017 | Kuznetsov | G06T 7/70 |

OTHER PUBLICATIONS

International Search Report for corresponding PCT/FR2017/050268 dated Jun. 21, 2017.
Written Opinion for corresponding PCT/FR2017/050268 dated Jun. 21, 2017.

* cited by examiner

DEVICE AND METHOD FOR ESTIMATING THE ATTENTION LEVEL OF A DRIVER OF A VEHICLE

CROSS-REFERENCE TO RELATED APPLICATIONS

This application is the US National Stage under 35 U.S.C. § 371 of International App. No. PCT/FR2017/050268 filed on Feb. 6, 2017, which claims priority to French application number 1651371 filed on Feb. 169, 2016, the contents of which (text, drawings and claims) are hereby incorporated by reference.

BACKGROUND

The present invention pertains to the field of devices designed for assisting the driving of vehicles, in particular to methods for assessing a driver's attention.

The invention relates more specifically to a method for assessing the ability of the driver of a vehicle to keep the vehicle in its traffic lane, in order to assess his level of attention and, if necessary, to warn him when he potentially unwillingly crosses a delimitation line of a traffic lane.

Today, motor vehicles include many driver assistance systems. These systems are referred to by an acronym well known to those skilled in the art of ADAS, or Advanced Driver Assistance Systems.

More and more motor vehicles now come equipped with such driver assistance systems. Most of the functions provided by these ADAS systems require the vehicle to be able to detect the lane in which it is located.

Among these functions, the association of transmission data from a frontal camera, capturing images of the road, in front of the vehicle, and data from a camera located in the passenger compartment, filming the face of the vehicle driver, can be used to determine a level of attention or inattentiveness of the driver.

Indeed, at present, the development of technologies relating to autonomous vehicles, more recently, to driving assistance functions involving vehicle automation phases, is such that the information relating to the level of attention or inattentiveness of the driver is crucial, especially for the purpose of making a possibly necessary resumption of the control of the vehicle.

In this context, the images from the frontal camera are analyzed so as to estimate the lateral position of the vehicle in its traffic lane, and in particular, to detect a possible unwanted crossing of a traffic lane line.

In the current state of the art, the information relating to the lateral position of the vehicle in its traffic lane is generally available only via the frontal camera and, therefore, it strongly depends on the intensity and availability of the images that it captures.

Some vehicles are indeed equipped with such a frontal camera capable of determining the lateral position of the vehicle in a traffic lane. However, as is known, the data from such a frontal camera can be altered because of the hypothesis used, often erroneous, of "level ground", or because of the hypothesis used, again often erroneous, of the horizontal attitude of the vehicle, etc.

In addition, for all these systems, calibration parameters are required for the cameras to calculate the relative position of the lines relative to the vehicle. This makes them sensitive to any de-calibration event, (e.g., shock on a camera, a change of attitude of the vehicle according to its load, etc.). Likewise, these systems consider that the ground is a horizontal plane in the vehicle marker. This hypothesis is not always verified and this leads to positioning errors when the road goes up or down, or when the road has a deviation on the ground portion used to detect the line.

Thus, according to current practice, the lateral position of a vehicle in a traffic lane is an information variable used by several driving assistance functions including the assessment of the level of attention of the driver, including in combination with an image analysis of the driver's face.

Thus, the system observes, in particular, the evolution of the lateral position of the vehicle over time to estimate a crossing of a traffic lane line and alerts the driver.

The Patent Publication FR2947769_A1 describes a system comprising a camera at the rear of the vehicle, designed to allow the tracking of the vehicle trajectory for the of sending an alert to the driver in case of deviation from a predetermined ideal trajectory. This publication is representative of the state of the art.

Today, the information relating to the position of the vehicle in a traffic lane is generally determined in real time from the images captured by a frontal camera.

However, in addition to the defects related to imprecision, or even the impossibility of estimating the lateral position of the vehicles in their traffic lanes, another defect of these systems is that the calibration parameters of the cameras used must be finely regulated. This makes them sensitive to any type of "de-calibration" caused by, e.g., a shock on a camera, a change of attitude of the vehicle, etc. Similarly, these systems consider that the ground is a horizontal plane in the vehicle marker, which constitutes an overall erroneous hypothesis.

Moreover, in order to assess the level of attention of the driver and to effectively detect a possible untimely crossing of the line, it is useful to store, by road segment, the evolution over time of the relative lateral position of the vehicle in its traffic lane.

SUMMARY OF THE INVENTION

Thus, briefly stated, to effectively solve the problem raised above, without creating new drawbacks, Applicant has invented a system to integrate images of the ground captured by at least one camera for a certain period of time, so as to eliminate errors due to inconsistencies or due to local unavailability. Thanks to the captured images, the method according to the invention allows for the creation of an aerial view of the vehicle in its traffic lane, integrated over a certain period of time.

Moreover, by following and anticipating the evolution over time of the lateral position of the vehicle in its lane, and preferably by associating this tracking with an adapted analysis of captured images of the driver's face, the method according to the invention allows an assessment of the driver's level of attention.

For this purpose, the method for assessing the level of attention of the driver of a taking into account the evolution of the lateral position of the vehicle in a traffic lane, according the invention, comprises reconstituting an aerial view of a road segment obtained by storing, and when the vehicle moves, a portion of the ground located closest to the vehicle.

the method according to the invention includes the positioning of the vehicle, at a previous instant, in such a reconstituted aerial view, as well as the storing of the successive positions of the vehicle, on the given road segment. The present invention thus allows for the creation of aerial view of a portion of road located in the time marker of the vehicle, upstream of the According to a preferred embodiment of the method according to the invention, the combination of an image analysis of the driver's face and an analysis of the successive positions of the vehicle in the aerial view allows for precise determination of the level of attention of the driver of the vehicle.

More specifically, the invention relates to a method for assessing the attention level of the driver of a moving vehicle in a traffic lane, comprising the following steps:

capturing images of the ground continuously, at the front and/or at the rear of the vehicle, by means of at least one adapted camera, said images corresponding to a ground surface having a width at least equal to one width and a depth of a traffic lane, reconstructing an aerial view of a road segment at successive current instants t, by integrating over time the images captured between an instant $t1=t-dt1$ and the current instant t, dt1 being positive, estimating the lateral position of the vehicle in the aerial view reconstructed at said successive current instants t, and storing said estimated positions of the vehicle between an instant $t2=t-dt2$ and the current instant t, dt2 being positive and independent of dt1 determining an estimated level of attention of the driver at an instant $t3=t-dt3$, dt3 being positive, the instant t3 being posterior to the instant t2 and the instant t3 being posterior or equal to the instant t1, according to:

the evolution of the lateral position of the vehicle in the aerial view between the instants t2 and t3, the analysis of the profile of a portion of a road belonging to the reconstructed aerial view at the current instant t and corresponding to a sequence of images captured between the instant t1 and the current instant t, said portion of a road being at least partially upstream of the vehicle at the instant t3.

Thus, thanks to the method according to the invention, it is possible to have an aerial view giving, in the time marker of the vehicle, a portion of the road section located upstream of the vehicle at instant t3. The analysis of the evolution of the lateral position of the vehicle over time is used to assess the level of attention of the driver.

According to one embodiment, after the step of reconstructing an aerial view of the ground, the method further includes the detection of at least one line forming a ground marker delimiting a traffic lane in the reconstructed aerial view, with the estimation of the position of the vehicle in the reconstructed aerial view consisting of determining the relative position of the vehicle with respect to at least one line.

According to a preferred embodiment, the method furthermore includes:

capturing images of the driver's face, analyzing the images of the driver's face, with determining the driver's level of attention also being a function of the analysis of the images of the driver's face.

According to another embodiment, the estimation of the relative position of the vehicle with respect to the at least one line in the reconstructed aerial view includes the assembly of successive captured images corresponding to a ground surface having a depth determined as a function of the speed of the vehicle.

According to another embodiment, the detection of at least one line forming a ground marker delimiting a traffic lane in the reconstructed aerial view comprises the implementation of a Hough transform.

According to yet another embodiment, the method according to the invention further comprises the step of warning the driver when the vehicle crosses the at least one line.

Advantageously, in a preferred embodiment the lane width may be equal to five meters.

Advantageously in a preferred embodiment the depth of the ground surface of the images captured is less than two meters.

The present invention also relates to a device for estimating the lateral position of a vehicle in a traffic lane, including at least one camera for continuously capturing images of the ground, at the front and/or at the rear of the vehicle, a calculation unit and a storage unit, each configured to implement the method according to one of the preceding embodiments.

Advantageously the at least one camera is a frontal camera disposed at the front of the vehicle.

DESCRIPTION OF THE FIGURES

Other features and advantages of the invention will appear on reading the detailed description of the embodiments of the invention, given by way of example only, and with reference to the drawings which show.

DETAILED DESCRIPTION OF THE INVENTION

In what follows, the embodiments described are more particularly related to an implementation of the device according to the invention within a motor vehicle. However, any implementation in a different context, particularly in any type of land vehicle, is also covered by the present invention.

Figure 1:
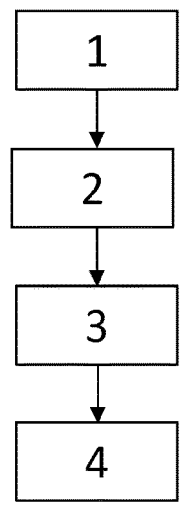
FIG. 1, the block diagram of the steps of the method for assessing the level of attention of the driver of a vehicle, according to the invention, FIG. 2, the diagram graphically representing the process of estimating the lateral position of the vehicle, according to a preferred embodiment of the method according to the invention.

FIG. 1 represents a schematic of the steps of the method according to the invention.

Thus, the method according to the invention provides a first step (1) of continuous image capture of the ground at the front and/or rear of the vehicle. The captured images correspond to a ground surface having a width corresponding at least to a width of a traffic i.e. about 5 meters. The camera used can thus be a frontal camera capturing images of the ground at the front of the vehicle, or a camera placed at the rear, such as a parking aid whose successive captured images are integrated over time to form successive reconstructed aerial views.

From the captured images, the method according to the invention comprises a second step (2) of reconstruction of aerial views at successive current instants t of a road segment, by integrating over time the images captured between an instant $t1=t-dt1$ and the current instant t, dt1 being positive.

It should be noted that the aerial view is not intended to be displayed, as a fine alignment is not required. According to one embodiment, a registration of the images is nonetheless provided for according to the estimated movement of the vehicle by means of odometric data obtained using, e.g., suitable sensors measuring wheel tops or the steering wheel angle.

According to another embodiment, a successive overlapping of the images captured is provided, in particular to facilitate the detection of lines of separation of traffic lanes and to improve the connections between successive images.

From the reconstructed aerial view, the method according to the invention provides a step 3 for estimating the lateral position of the vehicle on the road segment, in its traffic lane. The successive lateral positions of the vehicle on the road segment are calculated at each current instant t. In addition, the estimated positions of the vehicle are stored between an instant t2=t−dt2 and the current instant t, dt2 being positive and independent of dt1.

To this end, according to a preferred embodiment, the method includes the detection of one or more ground marking lines showing the delimitation between the traffic lanes.

There are known techniques for detecting lines in an image. For example, the detection of lines in a reconstructed aerial view can be realized by the implementation of a Hough transform. The Hough transform provides for identification of all the lines passing through a point (Y, X) of the ground. Conversely, for a pair of coefficients (a, b) defining a straight line, the Hough transform allows identification of a set of points (X, Y) located on this line. The coefficients 'a' and 'b' correspond respectively to the angle formed by the line with the Y-axis, and to the distance from the line to the origin.

It should be noted, however, that lines delimiting a traffic lane are not perfectly straight lines. Generally, these are clothoids, that is, lines with continuous curvature. In order to optimally exploit the process according to the invention, it is intended to transpose the principle of Hough to the analysis of such clothoids.

Indeed, a vehicle in which the method according to the invention is implemented a priori moves within a traffic lane substantially parallel to the lines that delimit it. According to one embodiment, the detection of these lines can thus be approximated, in the Hough space, with a search for lines whose coefficients 'a' are close to 0, and the coefficients 'b' are inferior to the maximum distance to which it is desired to detect lines of separation of the traffic lanes, on either side of the vehicle.

This filtering makes it possible to limit the cases of false positives. In the case of a generalized Hough transform, applied to clothoids, the principle and the objective of the filtering remain identical.

In addition, the markings on the ground showing the separation lines of the traffic lanes are always clearer than the road surface. Therefore, another filtering consists in considering only the gradients corresponding to clear lines on darker background, and of minimum size. This alternative simple filtering also serves to limit the cases of false positives.

Figure 2:
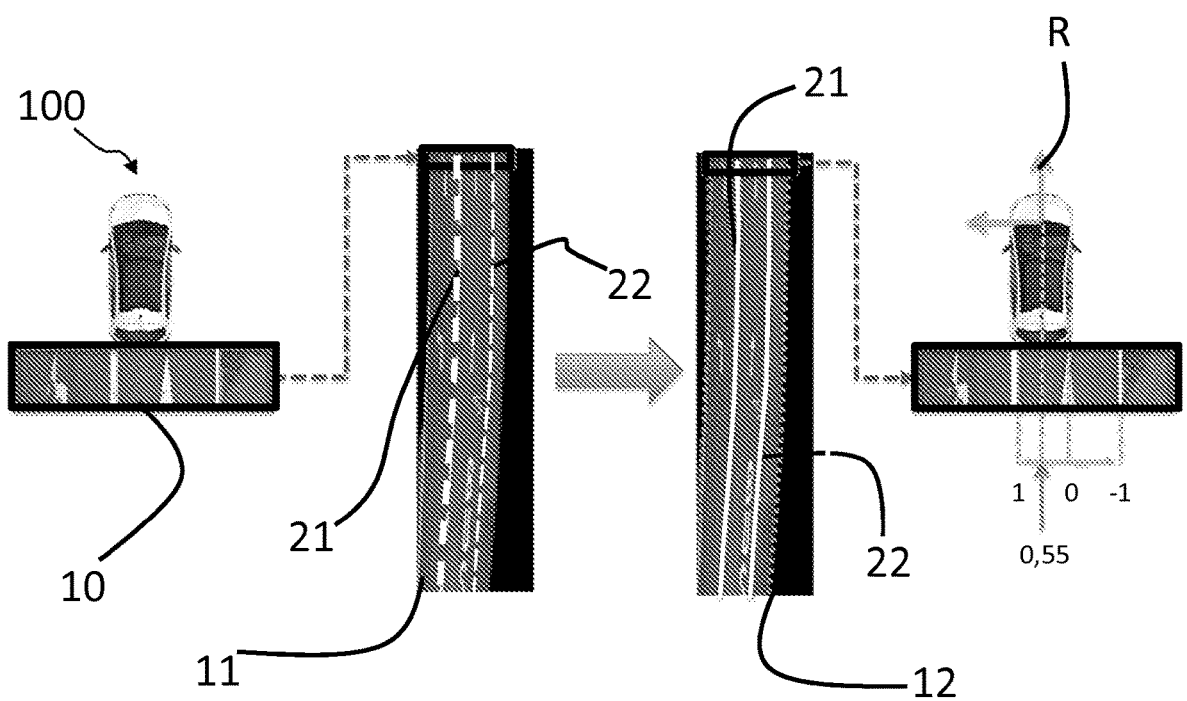

According to a further embodiment, a temporal filtering of the line detection algorithm is also provided. With reference to FIG. 2, the aerial view 11, reconstructed from captured images 10 integrated over time, becomes the aerial view 12 after temporal filtering, and provides for a better identification of the lines of separation 21, 22 between the traffic lanes.

It should be noted that other algorithms for detecting lines on the reconstructed aerial view can also be implemented, particularly in the context of the method according to the invention.

When several lines materialized by a marking on the ground are detected, the detection of the traffic lane in which the vehicle evolves is performed solely through the identification of relevant lines, i.e., those corresponding to the lines closest to the left and to the right of the vehicle and the lateral position of the vehicle in its traffic lane, which can thus be readily determinable.

According to an embodiment as shown in FIG. 2, the method provides, for example, for choosing the center of the vehicle as the origin 0, the lateral position of the vehicle 100 in the lane being calculated according to the width of the vehicle, so that −1 corresponds to the presence of the left wheels on the left line, and 1 to the presence of the right wheels on the line on the right. Thus, the values between −1 and 1, for example 0.55 as in FIG. 2, correspond to a vehicle within its traffic lane, while the values beyond −1 and 1 indicate a vehicle straddling two lanes of traffic.

It should be noted that other algorithms known in the art allowing estimation of the relative lateral position of the vehicle with respect to the separation of lines of the traffic lanes, detected in the aerial view reconstructed in accordance with the steps described above, can also be implemented in the context of the method according to the invention.

Therefore, the method according to the invention includes a fourth step (4) of determining an estimated level of attention of the driver at an instant t3=t−dt3, dt3 being positive, the instant t3 being posterior to the instant t2 and the instant t3 being posterior or equal to the instant t1, depending:
    on the change in the lateral position of the vehicle in the
        aerial view between the instants t2 and t3,
    on the profile analysis of a segment of a road belonging
        to the reconstructed aerial view at the current instant t
        and corresponding to a sequence of images captured
        between the instant t1 and the current instant t, said
        segment being at least partially located in front of the
        vehicle at the instant t3.

Indeed, the analysis of the level of attention of the driver is carried out at an instant t3 in the past relative to the current instant t. Thus, if the instant t3 and the instant t1 are equal, the portion of the road segment appearing on the aerial view and corresponding to the images captured between the instant t1 and the current instant t is entirely located upstream of the vehicle, at the instant "set in the past" t3=t1. If the instant t3 is posterior to the instant t1, then the portion of the road segment appearing on the aerial view and corresponding to the images captured between the instant t1 and the current instant t is partially located upstream of the vehicle and partially located at the rear of the vehicle, at the instant "set in the past" t3 to t1.

According to step 4 of the method according to the invention, at the instant t3 when the driver's attention level is determined, in the time marker of the vehicle, the reconstructed aerial view consequently always comprises a portion of the road segment located upstream of the vehicle. The profile of this segment located upstream of the vehicle is analyzed to establish an estimate of the level of attention of the driver, also depending on the change over time of the lateral position of the vehicle.

In addition, according to the invention, the successive aerial views of road segments are stored, as well as the successive estimated lateral positions of the vehicle, the storage being provided as long as necessary so that it is possible to know all the successive positions of the vehicle between the moment when it entered the reconstructed segment and the current instant t.

It should be noted that, for the application considered, the time shift and the delay induced by the fact that the driver's attention level is determined at an instant t3 set in the past relative to the current instant t are perfectly acceptable.

Furthermore, it is specified that, in the particular case of a traffic jam or slow speed, the number of successive lateral positions of the vehicle can be very high to cover the entire segment. For this reason, according to one embodiment, not all positions are necessarily stored in this case; only those sufficiently distant from each other are stored.

Thus, according to the invention, the analysis of the change in the lateral position of the vehicle on the segment allows an assessment to be directly performed as to the level of attention of the driver.

According to a preferred embodiment, the method further comprises capturing images of the driver's face whose analysis, by image processing according to known algorithms, gives an additional indication of the level of attention of the driver.

Thus, the analysis of the facial images is combined with the analysis of the evolution of the lateral position of the vehicle to determine the level of attention of the driver.

Additionally, in order to implement this method, the invention also provides a system comprising a camera, a calculation unit and a storage unit, all suitably adapted. As described above, the camera may, for example, be a frontal camera or a parking aid camera of the type used in existing vehicles.

It is specified that the present invention is not limited to the examples described above and is capable of numerous variants accessible to those skilled in the art.

The invention claimed is:

1. Method for assessing the level of attention of the driver of a moving vehicle in a traffic lane, comprising the following steps:
    continuously capturing images (10) of the ground, at the front and/or rear of the vehicle (100), by means of at least one adapted camera, said images (10) corresponding to a surface on the ground having a width at least equal to a width of a traffic lane and a depth,
    reconstructing an aerial view (11, 12) of a road segment at successive current instants t by integration over time of the captured images (10) between an instant t1=t−dt1 and the current instant t, dt1 being positive,
    estimating the lateral position of the vehicle (100) in the reconstructed aerial view (11, 12) at said successive current instants t, and storing said estimated positions of the vehicle between an instant t2=t−dt2 and the current instant t, dt2 being positive and independent of dt1,
    determining an assessed level of attention of the driver at an instant t3=t−dt3, dt3 being positive, the instant t3 being posterior to the instant t2 and the instant t3 being posterior or equal to the instant t1, according to:
    the evolution of the lateral position of the vehicle in the aerial view between the instants t2 and t3,
    the analysis of the profile of a portion of road belonging to the aerial view reconstructed at the current instant t and corresponding to a sequence of captured images between the instant t1 and the current instant t, said portion of road being at least partially located upstream of the vehicle at the instant t3.

2. The method according to claim 1, comprising, after the step of reconstructing an aerial view (11, 12) of the ground, detecting at least one line forming a ground marking delimitation of a traffic lane in said reconstructed aerial view, estimating the position of the vehicle (100) in the reconstructed aerial view (11, 12) consisting in determining the relative position of said vehicle with respect to said at least one line (21, 22).

3. The method according to one of the preceding claims, further comprising:
    capturing images of the drivers face,
    analyzing the images of the driver's face, the determination of the assessed level of attention of the driver being also a function of said analysis of the images of the driver's face.

4. The method according to one of the preceding claims, wherein the estimation of the relative position of the vehicle (100) with respect to said at least one line (11, 12) in the reconstructed aerial view comprises the assembly of successive captured images (10) corresponding to a ground surface having a depth determined according to the speed of the vehicle (100).

5. The method according to claim 1, wherein detecting at least one line (21, 22) forming a ground marker delimiting a traffic lane in the reconstructed aerial view (11, 12) comprises the implementation of a Hough transform.

6. The method according to one of the preceding claims, further comprising a driver warning step when the vehicle (100) crosses the said at least one line.

7. The method according to one of the preceding claims, said lane width being equal to five meters.

8. The method according to one of the preceding claims, said depth of the ground surface of the captured images being less than two meters.

9. Device for assessing the level of attention of the driver of a vehicle in a traffic lane, comprising at least one camera for continuously capturing images (10) of the ground, at the front and/or at the rear of the vehicle, a calculation unit and a storage unit, configured to implement the method according to one of the preceding claims.

10. The device according to the preceding claim, wherein said at least one camera is a frontal camera disposed at the front of the vehicle.

* * * * *